(12) United States Patent
Tsuji et al.

(10) Patent No.: US 12,146,959 B2
(45) Date of Patent: Nov. 19, 2024

(54) MONITORING CONTROL DEVICE, MONITORING SYSTEM, MONITORING CONTROL METHOD, AND NON-TRANSITORY COMPUTER-READABLE MEDIUM WITH PROGRAM STORED THEREIN

(71) Applicant: NEC Corporation, Tokyo (JP)

(72) Inventors: Akira Tsuji, Tokyo (JP); Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1088 days.

(21) Appl. No.: 17/041,150

(22) PCT Filed: Mar. 28, 2018

(86) PCT No.: PCT/JP2018/012616
§ 371 (c)(1),
(2) Date: Sep. 24, 2020

(87) PCT Pub. No.: WO2019/186742
PCT Pub. Date: Oct. 3, 2019

(65) Prior Publication Data
US 2021/0341612 A1 Nov. 4, 2021

(51) Int. Cl.
*G01S 17/88* (2006.01)
*G01S 7/481* (2006.01)
*G01S 17/42* (2006.01)

(52) U.S. Cl.
CPC ............ *G01S 17/88* (2013.01); *G01S 7/4814* (2013.01); *G01S 17/42* (2013.01)

(58) Field of Classification Search
None
See application file for complete search history.

(56) References Cited

U.S. PATENT DOCUMENTS

2007/0035627 A1\* 2/2007 Cleary ............... H04N 21/4223
348/E7.086
2010/0053330 A1\* 3/2010 Hellickson .............. G01S 19/13
382/103
(Continued)

FOREIGN PATENT DOCUMENTS

| CN | 106872994 A | 6/2017 |
| CN | 106872995 A | 6/2017 |

(Continued)

OTHER PUBLICATIONS

KR 20110109835 A English (Year: 2011).\*
(Continued)

*Primary Examiner* — Yuqing Xiao
*Assistant Examiner* — Jempson Noel

(57) ABSTRACT

A monitoring control device (1) according to the present embodiment is, for example, a monitoring control device used in a monitoring system that monitors a monitoring target facility by using a distance measurement sensor (5). The monitoring control device (1) includes: a sensing region acquisition unit (3) configured to acquire measurement data indicating a sensing region of the distance measurement sensor (5) provided in order to monitor a monitoring target facility; and a management unit (4) configured to identify a non-monitoring region of the monitoring target facility, based on the sensing region and position data of the distance measurement sensor (5).

13 Claims, 12 Drawing Sheets

(56) References Cited

U.S. PATENT DOCUMENTS

2012/0123563 A1\* 5/2012 Drinkard ............... H04N 7/181
　　　　　　　　　　　　　　　　　　700/13
2016/0189500 A1\* 6/2016 Kim ................ G08B 13/19608
　　　　　　　　　　　　　　　　　　386/223

FOREIGN PATENT DOCUMENTS

| JP | S58-178277 | A |   | 10/1983 |
| JP | 2001174547 | A | \* | 6/2001 |
| JP | 2006-030147 | A |   | 2/2006 |
| JP | 2011-112503 | A |   | 6/2011 |
| JP | 2011-215772 | A |   | 10/2011 |
| JP | 2012-008724 | A |   | 1/2012 |
| JP | 6195039 | B1 |   | 8/2017 |
| KR | 20110109835 | A | \* | 10/2011 |

OTHER PUBLICATIONS

JP-2001174547-A English (Year: 2001).\*
International Search Report mailed Jun. 19, 2018, in corresponding PCT International Application.
Japanese Office Action for JP Application No. 2020-510277 mailed on Oct. 12, 2021 with English Translation.
Japanese Office Action for JP Application No. 2020-510277 mailed on Apr. 5, 2022 with English Translation.

\* cited by examiner

MONITORING CONTROL DEVICE, MONITORING SYSTEM, MONITORING CONTROL METHOD, AND NON-TRANSITORY COMPUTER-READABLE MEDIUM WITH PROGRAM STORED THEREIN

CROSS-REFERENCE TO RELATED PATENT APPLICATIONS

This application is a National Stage Entry of International Application No. PCT/JP2018/012616, filed Mar. 28, 2018. The entire contents of the above-referenced application is expressly incorporated herein by reference.

TECHNICAL FIELD

The present disclosure relates to a monitoring control device, a monitoring system, a monitoring control method, and a non-transitory computer-readable medium with a program stored therein.

BACKGROUND ART

Patent Literature 1 discloses an object detection system including a plurality of laser sensors. Each of the laser sensors includes a laser light generation means, a detection means for detecting reflected light of laser light, and a rotating mirror that sweeps laser light. The rotating mirror rotates at a predetermined speed. The laser sensor measures a distance to an object, from a time ranging from output of pulsed light to detection of reflected light. Two laser sensors are isolated at a given interval in a width direction, and arranged in the same direction. Object detection angle ranges of the two laser sensors overlap.

Patent Literature 2 discloses a data processing device that communicates with a laser radar device. The data processing device includes a data communication device that acquires a gaze-direction wind speed value, a laser emission angle, posture information, position information, and a time. The data processing device calculates a wind vector by using not only the own gaze-direction wind speed value but also a gaze-direction wind speed value measured by another laser radar device.

CITATION LIST

Non Patent Literature

[Patent Literature 1] Japanese Unexamined Patent Application Publication No. 2011-112503
[Patent Literature 2] Japanese Patent No. 6195039

SUMMARY OF INVENTION

Technical Problem

A facility can be monitored by using a plurality of sensors. In a monitoring system using a plurality of sensors, it is desired to appropriately monitor the whole facility.

An object of the present disclosure is to solve such a problem, and provide a monitoring control device, a monitoring system, a monitoring control method, and a program that can appropriately monitor a monitoring target facility.

Solution to Problem

A monitoring control device according to the present disclosure includes: a measurement data acquisition unit configured to acquire measurement data indicating a sensing region of a distance measurement sensor provided in order to monitor a monitoring target facility; and a management unit configured to identify a non-monitoring region in map data indicating the monitoring target facility, based on the sensing region and position data of the distance measurement sensor.

A monitoring system according to the present disclosure includes: a distance measurement sensor configured to perform sensing by sweeping an optical signal: and the monitoring control device described above.

A monitoring control method according to the present disclosure includes: a step of acquiring measurement data indicating a sensing region of a distance measurement sensor provided in order to monitor a monitoring target facility; and a step of identifying a non-monitoring region in map data indicating the monitoring target facility, based on the sensing region and position data of the distance measurement sensor.

A non-transitory computer-readable medium according to the present disclosure stores a program causing a computer to execute a monitoring control method, the monitoring control method including: a step of acquiring measurement data indicating a sensing region of a distance measurement sensor provided in order to monitor a monitoring target facility; and a step of identifying a non-monitoring region in map data indicating the monitoring target facility, based on the sensing region and position data of the distance measurement sensor.

Advantageous Effects of Invention

The present disclosure is able to provide a monitoring control device, a monitoring system, a monitoring control method, and a program that can appropriately monitor a monitoring target facility.

DESCRIPTION OF EMBODIMENTS (Overview of Example Embodiment According to Present Disclosure)

Figure 1:
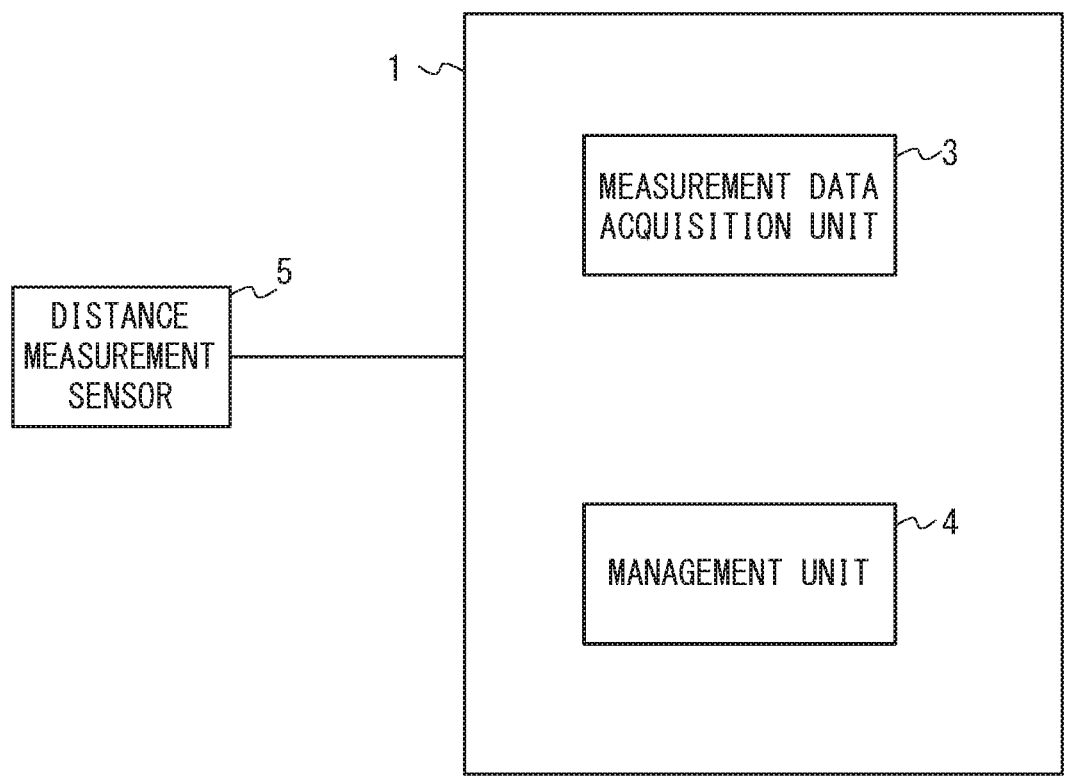
FIG. 1 is a diagram illustrating an overview of a monitoring control device according to an example embodiment of the present disclosure.

Prior to description of an example embodiment of the present disclosure, an overview of the example embodiment according to the present disclosure is described. FIG. 1 is a diagram illustrating an overview of a monitoring control device 1 according to the example embodiment of the present disclosure.

The monitoring control device 1 includes a measurement data acquisition unit 3 that acquires measurement data indicating a sensing region of a distance measurement sensor 5 provided in order to monitor a monitoring target facility, and a management unit 4 that identifies a non-monitoring region in map data indicating the monitoring target facility, based on the sensing region and position data of the distance measurement sensor 5.

The monitoring control device 1 enables allocation of a new resource such as another sensor or a security guard to a non-monitoring region that is not monitored by the distance measurement sensor 5. Thus, the monitoring target facility can be appropriately monitored.

Furthermore, appropriate monitoring can also be performed by a monitoring control method executed by the above-described monitoring control device 1. The monitoring control method executed by the monitoring control device 1 is achievable by a program executed by a computer.

Example Embodiment 1

Figure 2:
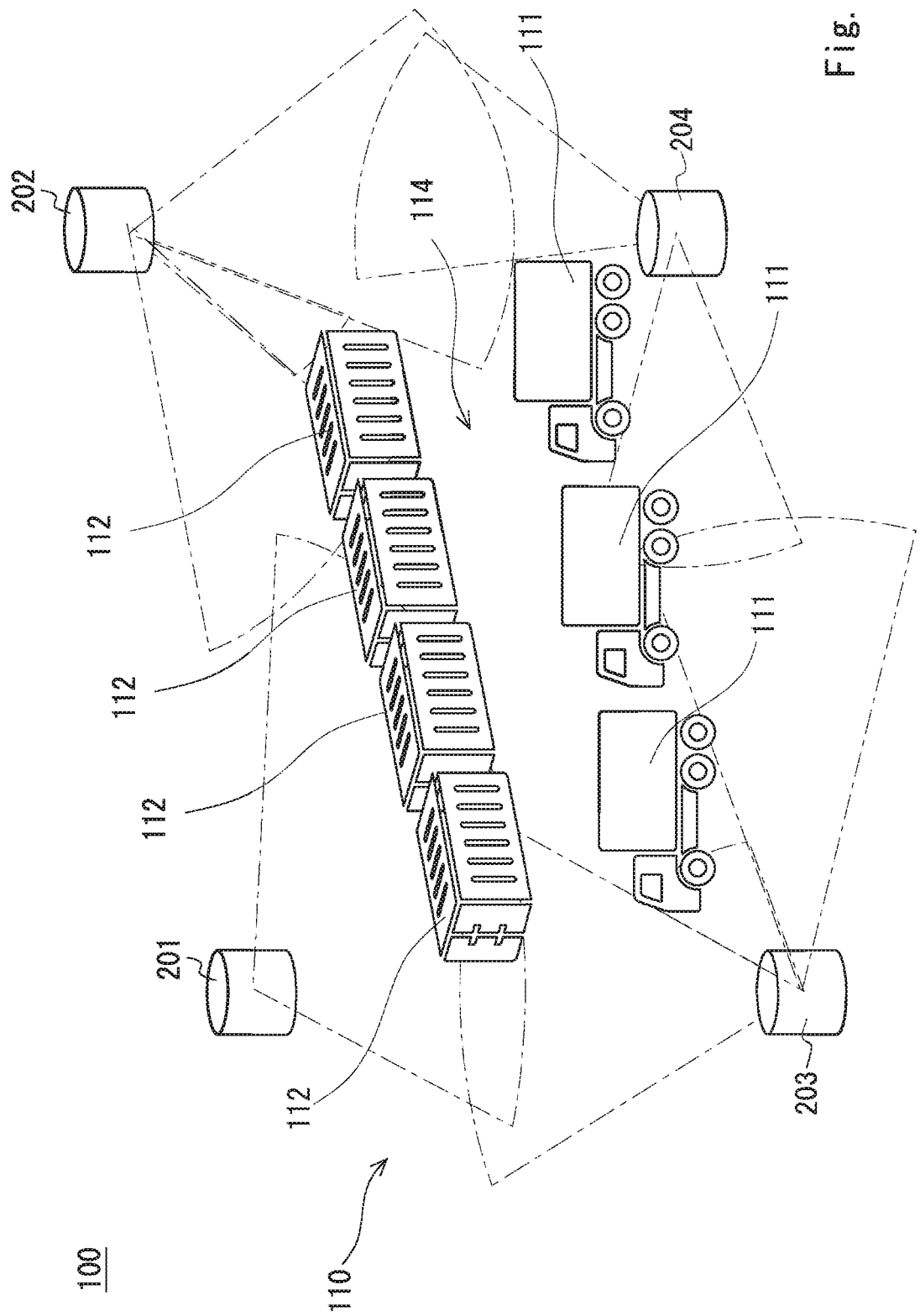
FIG. 2 is a diagram schematically illustrating a monitoring system and a monitoring target facility.
Figure 3:
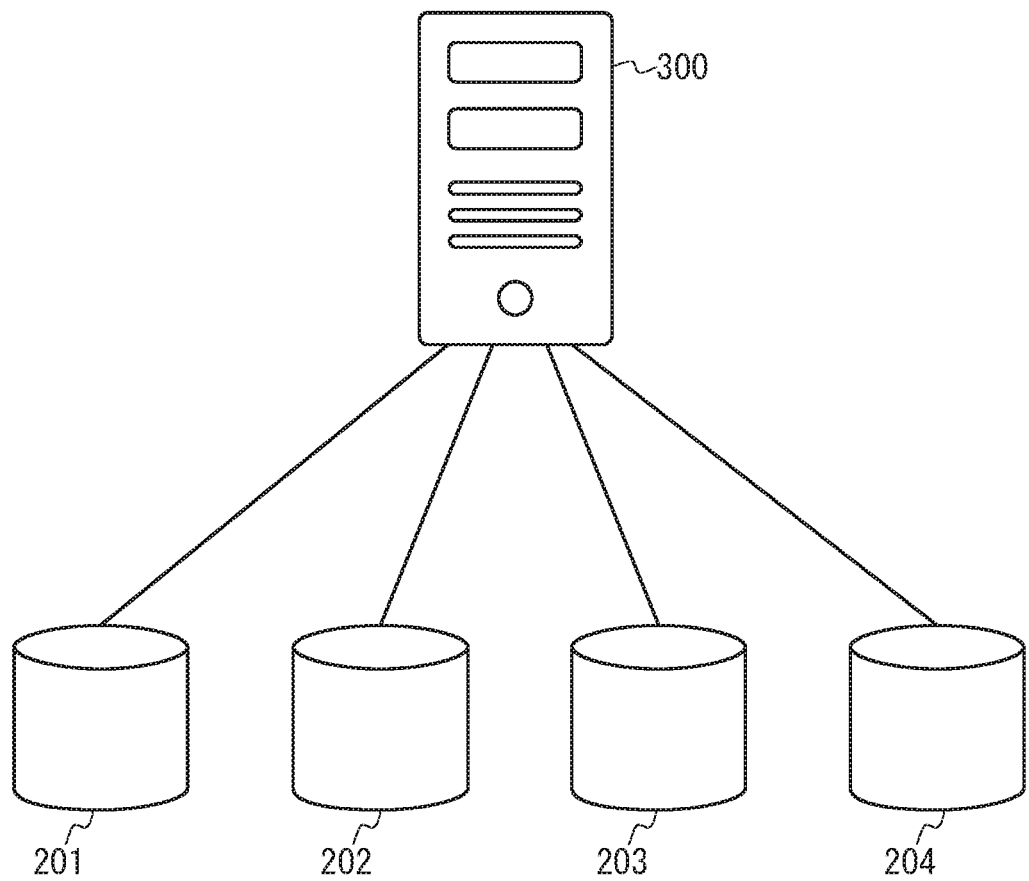
FIG. 3 is an overall diagram illustrating a monitoring system according to Example Embodiment 1.

A monitoring control device and a monitoring system according to the present example embodiment are described by using FIGS. 2 and 3. FIG. 2 is a diagram schematically illustrating an overall configuration of a monitoring system 100 that monitors a target facility 110 by using one or more distance measurement sensors. FIG. 3 is a diagram illustrating a configuration of the monitoring system 100. As illustrated in FIGS. 2 and 3, the monitoring system 100 includes a monitoring control device 300 and distance measurement sensors 201 to 204.

In FIG. 2, the target facility 110 to be a monitoring target of the monitoring system 100 is illustrated as being a physical distribution facility. Naturally, the target facility 110 monitored by the monitoring system 100 is not limited to a physical distribution facility. For example, the target facility 110 may be a private facility such as a shopping mall or a station. Alternatively, the target facility 110 may be an infrastructure facility or the like, such as an airport or a power plant.

A moving object 111 and a fixed object 112 exist in the target facility 110. The moving object 111 is a vehicle such as a truck. The moving object 111 may be a human being. The fixed object 112 is, for example, a container, a building, or the like.

One or a plurality of distance measurement sensors 201 to 204 are placed in the target facility 110. Although four distance measurement sensors 201 to 204 are arranged in FIG. 1, the number of the distance measurement sensors 201 to 204 is not particularly limited. The number and arrangement positions of sensors may be properly determined depending on a size, layout, and the like of the target facility 110. The distance measurement sensors 201 to 204 are preferably arranged in such a way that the whole target facility 110 can be monitored.

The moving object 111 or the fixed object 112 becomes a target to be a measurement target of the distance measurement sensors 201 to 204. In other words, the distance measurement sensors 201 to 204 measure a distance to a target.

The monitoring control device 300 is a computer such as a personal computer or a server. The monitoring control device 300 is communicably connected to the distance measurement sensors 201 to 204 in a wired or wireless way. For example, a wireless LAN such as WiFi (registered trademark) may be used. The monitoring control device 300 collects measurement data measured by the distance measurement sensors 201 to 204.

Each of the distance measurement sensors 201 to 204 is a laser radar, a photoelectric sensor, an ultrasonic sensor, a three-dimensional camera (stereo camera), or the like, and measures a distance to a target being present around. Not only an object but also a living body such as a human being or an animal may be a measurement target. In the following description, it is assumed that a target or a measurement target is not limited to an object, and includes a living body such as a human being or an animal.

Each of the distance measurement sensors 201 to 204 is, for example, a lidar (LIDAR; Light Detection and Ranging). Specifically, each of the distance measurement sensors 201 to 204 is a micropulse lidar. Each of the distance measurement sensors 201 to 204 is able to recognize a three-dimensional coordinate in a three-dimensional space. The three-dimensional space may be expressed by an orthogonal coordinate system, or may be expressed by a polar coordinate system. Measurement data of each of the distance measurement sensors 201 to 204 are expressed by a local coordinate system around the sensor.

In the following description, a coordinate system indicating the whole space of the target facility 110 is indicated by an XYZ three-dimensional orthogonal coordinate system as a global coordinate system. Note that, in the following description, an example in which a measurement or monitoring is performed in a two-dimensional space, i.e., a horizontal plane (XY plane) may be described for simplification of description.

Figure 4:
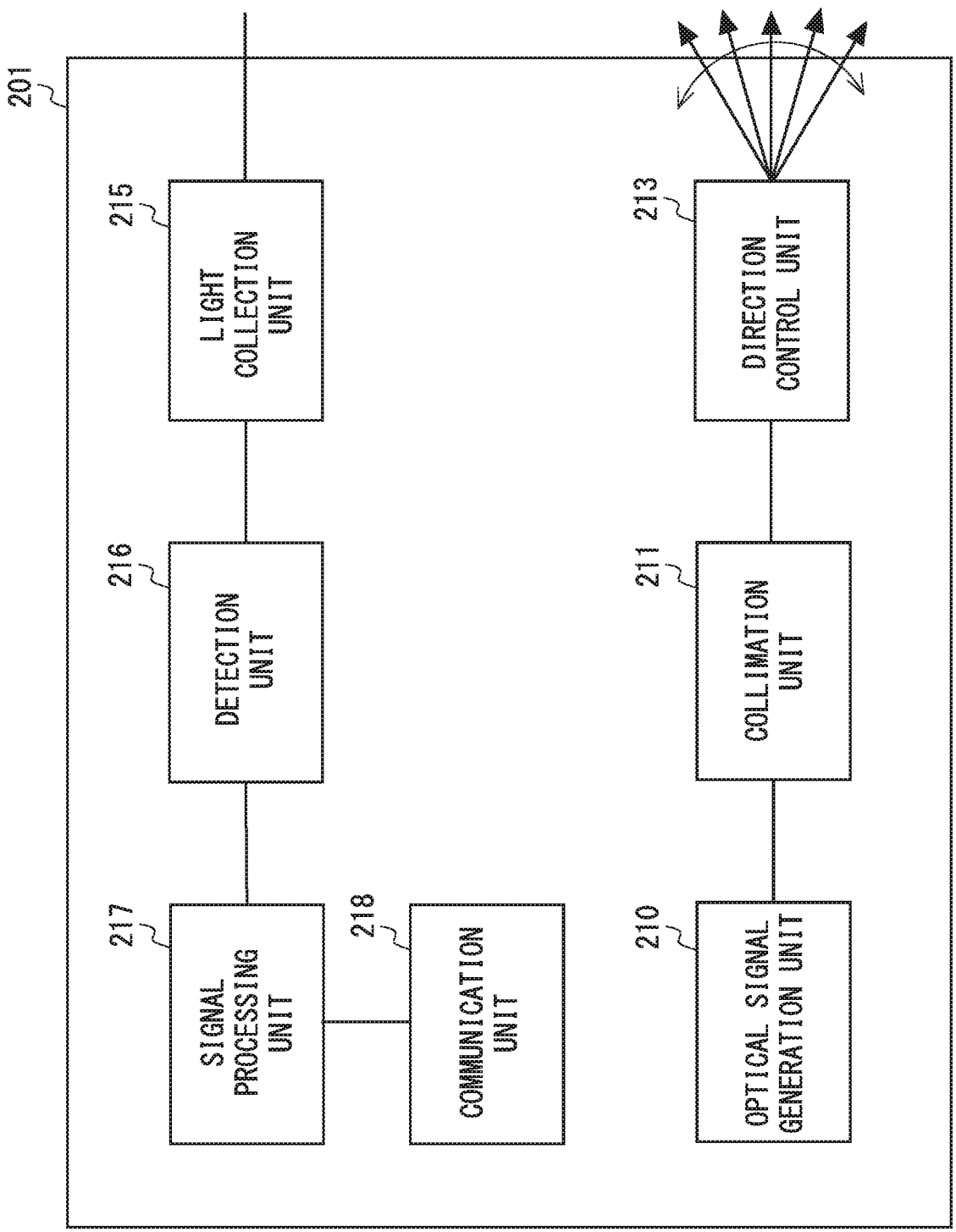
FIG. 4 is a functional block diagram illustrating a configuration of a distance measurement sensor.

A configuration of each of the distance measurement sensors 201 to 204 is described below by using FIG. 4. FIG. 4 illustrates the configuration of the distance measurement sensor 201 on behalf of the distance measurement sensors 201 to 204. In other words, since the distance measurement sensors 202 to 204 each have a configuration similar to that of the distance measurement sensor 201 illustrated in FIG. 4, description is omitted for the distance measurement sensors 202 to 204.

FIG. 4 is a functional block diagram illustrating the distance measurement sensor 201. The distance measurement sensor 201 will be described as a lidar using pulsed laser light as a measurement signal. The distance measurement sensor 201 includes an optical signal generation unit 210, a collimation unit 211, a direction control unit 213, a light collection unit 215, a detection unit 216, a signal processing unit 217, and a communication unit 218.

The optical signal generation unit 210 includes a light source for generating an optical signal serving as a measurement signal. Specifically, the optical signal generation unit 210 has a laser diode or the like that generates pulsed laser light. The optical signal generation unit 210 generates pulsed laser light having a predetermined repetition frequency as a measurement signal. The optical signal generation unit 210 may be able to adjust the light intensity, the repetition frequency, etc. of the measurement signal.

The collimation unit 211 includes a lens and the like, and collimates pulsed laser light that is an optical signal. For example, the collimation unit 211 converts the pulsed laser light into a parallel light flux.

The direction control unit 213 controls the emission direction of the optical signal. For example, the direction control unit 213 has a scanner and an optical system, and sweeps the emission direction of the optical signal. The direction control unit 213 has a rotating mirror or the like, and sweeps the optical signal at a constant rotation speed. The rotation of the rotating mirror makes it possible to change the emission direction of the optical signal.

For example, a rotating mirror that can rotate by 360° is used as a scanner with a Z direction orthogonal to a horizontal plane (XY plane) set as a rotation axis, which enables the distance measurement sensor 201 to emit optical signals in all directions. Of course, the sweeping range is not limited to the entire circumference of 0 to 360°, but may be a partial range. In other words, the sweeping range may be set according to a direction to be monitored. In addition the sweeping range may be variable.

Furthermore, the direction control unit 213 may also sweep the pulsed laser light in an up-and-down direction. The direction control unit 213 can perform three-dimensional sweeping by changing both the azimuth angle and the elevation angle. Note that the azimuth angle is an angle within a horizontal plane centered on the distance measurement sensor 201 and having a reference azimuth (for example, the true north direction) as 0°. The elevation angle is an angle within a vertical plane where the horizontal direction is 0° and the vertically upward direction is 90°.

The optical signal swept by the direction control unit 213 is emitted from the distance measurement sensor 201. The direction in which the optical signal is emitted corresponds to the sweeping angle in the direction control unit 213, that is, the angle of the rotating mirror. If it is assumed that the repetition cycle of the pulsed laser light and the sweeping speed are constant, an optical signal is emitted at each constant azimuth angle. The optical signal is reflected by an object around the distance measurement sensor 201. The optical signal reflected by the object is used as reflected light. Since the optical signal is pulsed light, the reflected light is also pulsed light.

The light collection unit 215 has a lens and the like, and collects the reflected light reflected by the object. The detection unit 216 detects the reflected light collected by the light collection unit 215. The detection unit 216 has a photosensor such as a photodiode. The detection unit 216 outputs a detection signal corresponding to the detected light amount to the signal processing unit 217.

The signal processing unit 217 has a circuit and a processor that perform predetermined processing on the detection signal from the detection unit 216. The signal processing unit 217 calculates the distance to a target object based on the detection signal. The signal processing unit 217 estimates the time from the emission of the pulsed laser light as an optical signal until the detection by the detection unit 216. Then, the signal processing unit 217 measures the distance to the target object based on the estimated time. In other words, the signal processing unit 217 calculates the distance to the target object from the difference between a timing when the optical signal generation unit 210 generates pulsed laser light and a timing when the detection unit 216 detects the pulsed laser light. The signal processing unit 217 determines a turnaround time to a reflection position where the optical signal is reflected, and calculates the distance to the surface of the target object based on the turnaround time.

The distance to the target object around the distance measurement sensor 201 can be measured by performing the above operation. Further, since the direction control unit 213 controls the emission direction of the optical signal, it is possible to measure the distance to the target object in each azimuth. The direction control unit 213 repeatedly sweeps a predetermined sweeping range, so that measurement data is updated at any time. A status change in the target facility 110 can be sensed.

When the direction control unit 213 performs a two-dimensional sweeping, the distance measurement sensor 201 can acquire measurement data in which a distance is associated with each azimuthal angle. For example, measurement data are (azimuthal angle 0°/distance 100 in), (azimuthal angle 10°/distance 100 in), (azimuthal angle 30°/distance 50 in), . . . (azimuthal angle 350°/distance 50 in).

The distance measurement sensor 201 can acquire a two-dimensional map in a local coordinate system as measurement data. The local coordinate system is a polar coordinate indicating a distance to a target with the distance measurement sensor 201 as an origin (center). The measurement data indicate, with the local coordinate system, a sensing region sensed by the distance measurement sensor 201.

Figure 5:
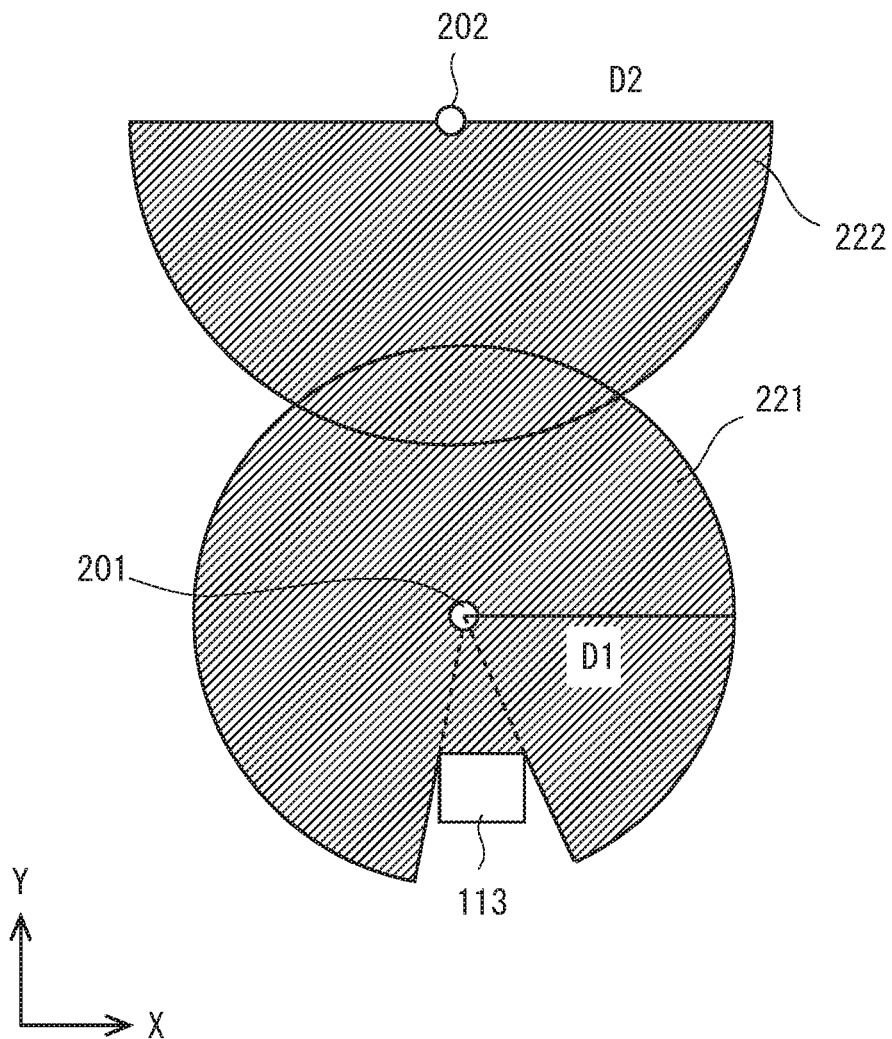
FIG. 5 is a diagram for describing a sensing region of the distance measurement sensor.

The sensing region is described by using FIG. 5. FIG. 5 is a plan view schematically illustrating sensing regions 221 and 222 of the distance measurement sensors 201 and 202. Herein, the distance measurement sensor 201 two-dimensionally sweeps inside of a horizontal plane (XY plane) within a sweeping range of 0 to 360°. The distance measurement sensor 202 two-dimensionally sweeps the inside of the horizontal plane within a sweeping range of 90 to 270°. It is assumed that measurable distances (measurement ranges) of the distance measurement sensors 201 and 202 are D1 and D2. Note that the sensing region 221 and the sensing region 222 partially overlap each other.

The sensing region 222 of the distance measurement sensor 202 has a semicircular shape with the measurable distance D2 as a radius. The sensing region 221 of the distance measurement sensor 201 is based on a circular shape with the measurable distance D1 as a radius, and the sensing region 221 is narrowed as much as a target 113. In other words, when there is no target 113 around the distance measurement sensor 201, the distance measurement sensor 201 is able to sense a circular shape with the measurable distance D1 as a radius, but when the target 113 is present around the distance measurement sensor 201, a measurement distance becomes shorter than the measurable distance D1 in an azimuth in which the target 113 is present. Therefore, the sensing region 221 becomes narrow depending on a position and a size of the target 113.

The distance measurement sensor 201 becomes able to sense up to a surface of the target 113. In other words, in an azimuth in which the target 113 is present, the target 113 becomes an obstacle of an optical signal, and the optical signal does not reach a side farther than the target 113. The distance measurement sensor 201 may not sense a side farther than the target 113. When the target 113 is present, a place hidden behind the target 113 when seen from the distance measurement sensor 201 may not be monitored. When the target 113 is the moving object 111 that moves, the sensing region 221 dynamically changes. Note that, when the distance measurement sensors 201 and 202 perform a three-dimensional sweeping, the sensing regions 221 and 222 become three-dimensional spaces.

The communication unit 218 transmits measurement data to the monitoring control device 300 by wired communication or wireless communication. A communication method of the communication unit 2118 is not particularly limited.

The communication unit 218 transmits latest measurement data at each constant interval. For example, when measurement of all or part of the sweeping range (e.g., 0 to 360°) is finished, the communication unit 218 transmits newly acquired measurement data. The distance measurement sensor 201 repeatedly performs sweeping of an optical signal, and thereby, the measurement data are updated.

Note that the above-described example illustrates a numerical value example in which the sweeping range of 0 to 3600 is measured at each angle of 10°, the sweeping range and a measurement interval are not limited to the above-described values. In other words, the sensing region 221 changes according to an emission interval of pulsed laser light, the sweeping range, and the like. When two or more objects are present around the distance measurement sensors 201 to 204, each of the objects becomes a target. For example, in the monitoring system 100 illustrated in FIG. 2, the distance measurement sensor 203 can measure distances for both the moving object 111 and the fixed object 112. In other words, in the distance measurement sensor 201, the sensing region 221 is defined by a distance to a nearest target in each azimuth.

As described above, each of the distance measurement sensors 201 to 204 transmits measurement data to the monitoring control device 300. The monitoring control device 300 controls the monitoring of the target facility 110, based on the measurement data measured by the distance measurement sensors 201 to 204.

Figure 6:
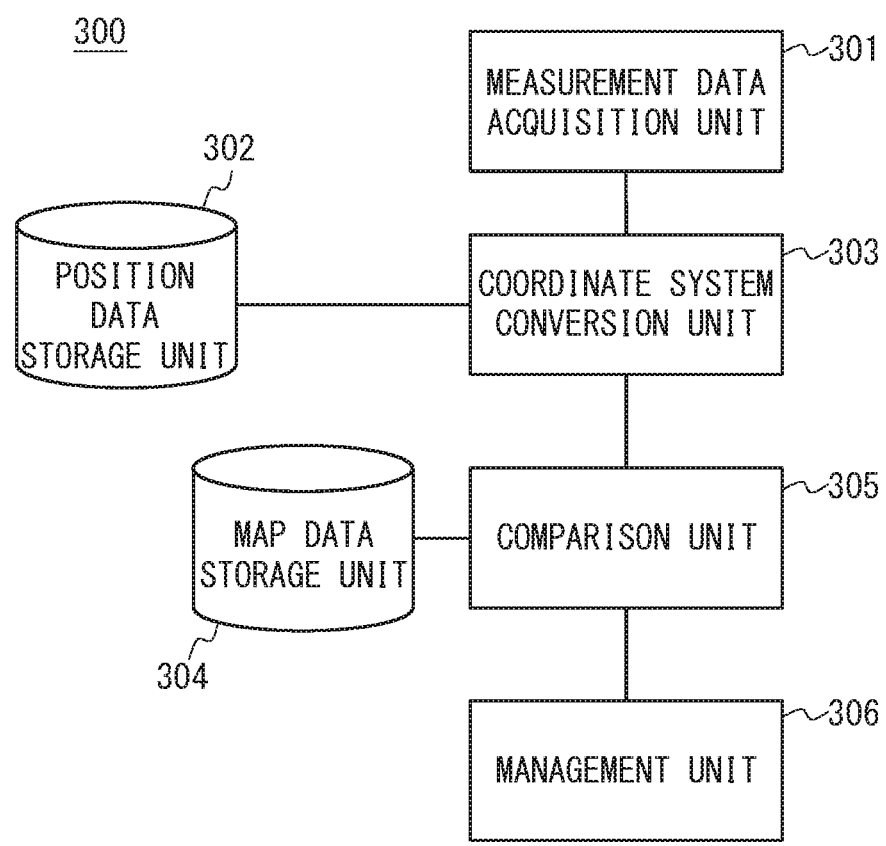
FIG. 6 is a functional block diagram illustrating a configuration of a monitoring control device according to Example Embodiment 1.

The monitoring control device 300 is described by using FIG. 6. FIG. 6 is a functional block diagram illustrating a configuration of the monitoring control device 300. The monitoring control device 300 includes a measurement data acquisition unit 301, a position data storage unit 302, a coordinate system conversion unit 303, a map data storage unit 304, a comparison unit 305, and a management unit 306.

The measurement data acquisition unit 301 acquires measurement data from the distance measurement sensors 201 to 204. Each of the distance measurement sensors 201 to 204 transmits measurement data at each constant interval. The measurement data acquisition unit 301 sequentially acquires latest measurement data.

Measurement data are data in which an azimuthal angle and a distance are associated with each other. In other words, measurement data indicate, with a local coordinate system, a latest sensing region sensed by each of the distance measurement sensors 201 to 204. The measurement data acquisition unit 301 acquires a sensing region of the local coordinate system. The measurement data acquisition unit 301 acquires measurement data for each of the distance measurement sensors 201 to 204. In other words, the measurement data acquisition unit 301 differentiates the distance measurement sensors 201 to 204, and acquires measurement data. The measurement data acquisition unit 301 outputs the measurement data to the coordinate system conversion unit 303.

The position data storage unit 302 has a memory and the like, and stores position data of the distance measurement sensors 201 to 204 in the target facility 110. For example, the position data storage unit 302 stores, as an XYZ position in a global coordinate system, a position where each of the distance measurement sensors 201 to 204 is placed. Position data are acquired by reading position data in the position data storage unit 302.

The coordinate system conversion unit 303 converts measurement data, i.e., a coordinate system of a sensing region. Since measurement data are measured in a local coordinate system with the distance measurement sensor as an origin, a sensing region is also indicated with a local coordinate system. Therefore, the coordinate system conversion unit 303 converts a coordinate system of a sensing region from a local coordinate system to a global coordinate system, by referring to position data of the distance measurement sensors 201 to 204. The coordinate system conversion unit 303 unifies coordinate systems of sensing regions of all the distance measurement sensors 201 to 204 into a global coordinate system. The coordinate system conversion unit 303 acquires a sensing region in the global coordinate system. The coordinate system conversion unit 303 outputs the sensing region in the global coordinate system to the comparison unit 305.

The map data storage unit 304 has a memory and the like, and stores static map data of the target facility 110. Static map data are acquired by reading data in the map data storage unit 304. Static map data include information indicating a size and a shape of the target facility 110, and are indicated with a global coordinate system.

Static map data also include information relating to a size, a position, and a shape of the fixed object 112 placed in the target facility 110. Further, static map data include information indicating sensing regions of the distance measurement sensors 201 to 204 in a state where there is no intruder or intruding object (hereinafter, a normal state). In other words, the map data storage unit 304 stores a sensing region in a normal state in association with a map indicating the target facility 110.

For example, static map data are bit map data that differentiate a sensible position and an insensible position as different values in a normal state. The insensible position and the sensible position can be discriminated from information relating to the distance measurement sensors 201 to 204, information relating to the fixed object 112, and the like. A sensing region in a normal state may be separately stored for each distance measurement sensor, or sensing regions of all distance measurement sensors may be collectively stored.

The comparison unit 305 compares static map data with a sensing region based on measurement data. The measurement data are data indicating a latest sensing region. In other words, the comparison unit 305 compares a sensing region in a normal state with a latest sensing region. The comparison unit 305 determines whether the latest sensing region has become smaller than the sensing region in a normal state. The comparison unit 305 outputs a comparison result to the management unit 306.

The management unit 306 identifies a non-monitoring region in map data, based on the comparison result. When the latest sensing region has become smaller than the sensing region in a normal state, the management unit 306 identifies a non-monitoring region on map data. The non-monitoring region is, for example, a region that has become a blind spot due to an intruder or an intruding object (hereinafter, an intruder and an intruding object are collectively referred to as an intruding object).

Figure 7:
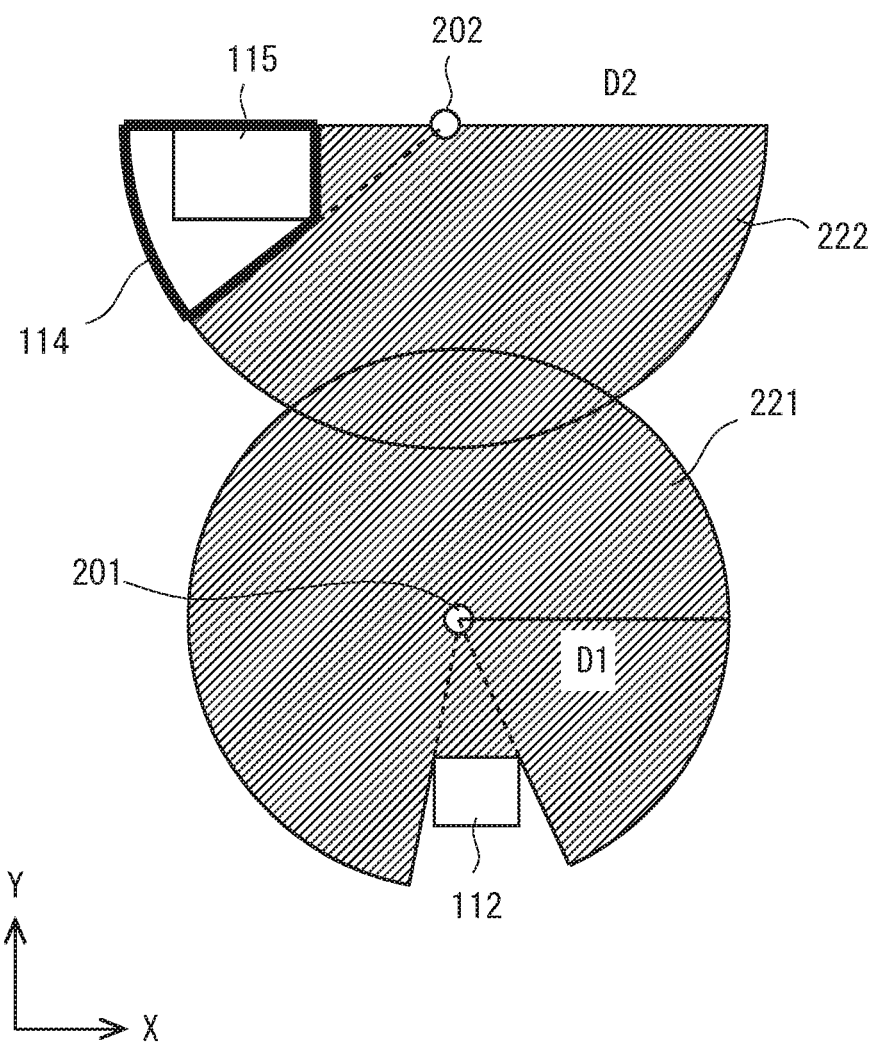
FIG. 7 is a diagram for describing a non-monitoring region.

FIG. 7 is a diagram describing an example when an intruding object 115 has intruded into the sensing region 222 illustrated in FIG. 5. Since the intruding object 115 has intruded into the sensing region 222, the sensing region 222 becomes narrower than in FIG. 5, and a narrowed region becomes a non-monitoring region 114. In other words, the non-monitoring region 114 becomes a blind spot where an optical signal is blocked by the intruding object 115. Intrusion of the intruding object 115 can be sensed according to a comparison result in the comparison unit 305.

The management unit 306 outputs, to a user, a fact that the non-monitoring region 114 is generated. The user is a surveillant, a security guard, or the like of the target facility 110. For example, the management unit 306 displays, on a monitor, a coordinate or the like indicating a non-monitoring region. Alternatively, the management unit 306 may display a map of the target facility 110 on the monitor, based on map data, and superimpose a non-monitoring region on the displayed map. Alternatively, the management unit 306 may inform the user of the non-monitoring region 114 by outputting an alarm sound or a voice from a speaker. In order to monitor a place that has newly become the non-monitoring region 114, the user sends a security guard or a new sensor to the non-monitoring region 114. This enables appropriate monitoring.

A sensing region dynamically changes due to comings and goings of a person or a thing. For example, in FIG. 2, the non-monitoring region 114 to be a blind spot of a distance measurement sensor is generated by entrance of the moving object 111 being a truck. When a sensing region becomes narrow, and the non-monitoring region 114 is generated, the user causes a security guard to patrol. Alternatively, the user may send a new sensor by using a drone or a vehicle. In this way, facility monitoring free of a blind spot can be performed with a minimum patrol resource.

Note that the comparison unit 305 may perform a comparison for each distance measurement sensor, or may integrate sensing regions of a plurality of distance measurement sensors and perform a comparison. Monitoring can be appropriately performed by integrating sensing regions of a plurality of distance measurement sensors. For example, even when a sensing region of one distance measurement sensor becomes small, the region that has become small may be sensed by another distance measurement sensor. It is only necessary that a sensing region has not become small in the whole map of the target facility 110. In other words, when a region that may not be sensed by any distance measurement sensor increases, the comparison unit 305 identifies the increased region as a non-monitoring region.

Furthermore, when sensing regions of the distance measurement sensors 201 to 204 are variable, allocation of the sensing regions may be changed in such a way that a non-monitoring region is monitored. For example, when part of a sensing region of a distance measurement sensor has become the non-monitoring region 114, one or more other distance measurement sensors may expand sensing regions, and thereby, the non-monitoring region 114 may be covered.

In this case, the monitoring control device 300 notifies the distance measurement sensors 201 to 204 of the change of the sensing region. The management unit 306 sets the sensing region 221, for example, in such a way as to cover the non-monitoring region 114 generated by narrowing of the sensing region 221 of the distance measurement sensor 201. Each of the distance measurement sensors 201 to 204 controls the sweeping range, based on the notified setting change of the sensing region. In this case, each of the distance measurement sensors 201 to 204 includes a communication unit (not illustrated) for receiving a change instruction of the sweeping range, and a control unit (not illustrated) that changes the sweeping range in accordance with the change instruction.

Note that, although the above description assumes that the distance measurement sensors 201 to 204 are fixed to the target facility 110, one or more of the distance measurement sensors 201 to 204 may be provided movably in the target facility 110. For example, a distance measurement sensor may include a movement mechanism such as a wheel or a motor. Alternatively, a distance measurement sensor may be mounted on a movement device such as a vehicle or a drone. In this case, for example, position data of the sensor may be added to measurement data. Naturally, a transmission device different from the distance measurement sensor may transmit the position data. The movement mechanism may include a sensor that acquires position data according to a movement amount, or a global positioning system (GPS) or the like may acquire position data.

The position data storage unit 302 stores latest position data. Position data stored in the position data storage unit 302 are sequentially updated. The coordinate system conversion unit 303 may calculate a sensing region with reference to latest position data of a distance measurement sensor.

Although the management unit 306 identifies a non-monitoring region, based on a result of a comparison between static map data and measurement data, data to be a comparison target of measurement data are not limited to static map data in a normal state. For example, the management unit 306 may identify a non-monitoring region, based on a comparison result of comparing measurement data before and after update. In other words, the map data storage unit 304 stores a sensing region based on measurement data acquired before. The comparison unit 305 compares the sensing region based on the measurement data acquired before with a sensing region based on latest measurement data. The comparison unit 305 may compare a latest sensing region with a sensing region before update.

Although it has been described that all of the distance measurement sensors 201 to 204 are lidars, another type of distance measurement sensor may be used. For example, a distance to a target may be measured by using an ultrasonic sensor as a distance measurement sensor. Alternatively, the target facility 110 may be monitored by combining a plurality of types of distance measurement sensors. For example, the distance measurement sensors 201 and 202 may be lidars, the distance measurement sensor 203 may be an ultrasonic sensor, and the distance measurement sensor 204 may be a stereo camera or the like.

Figure 8:
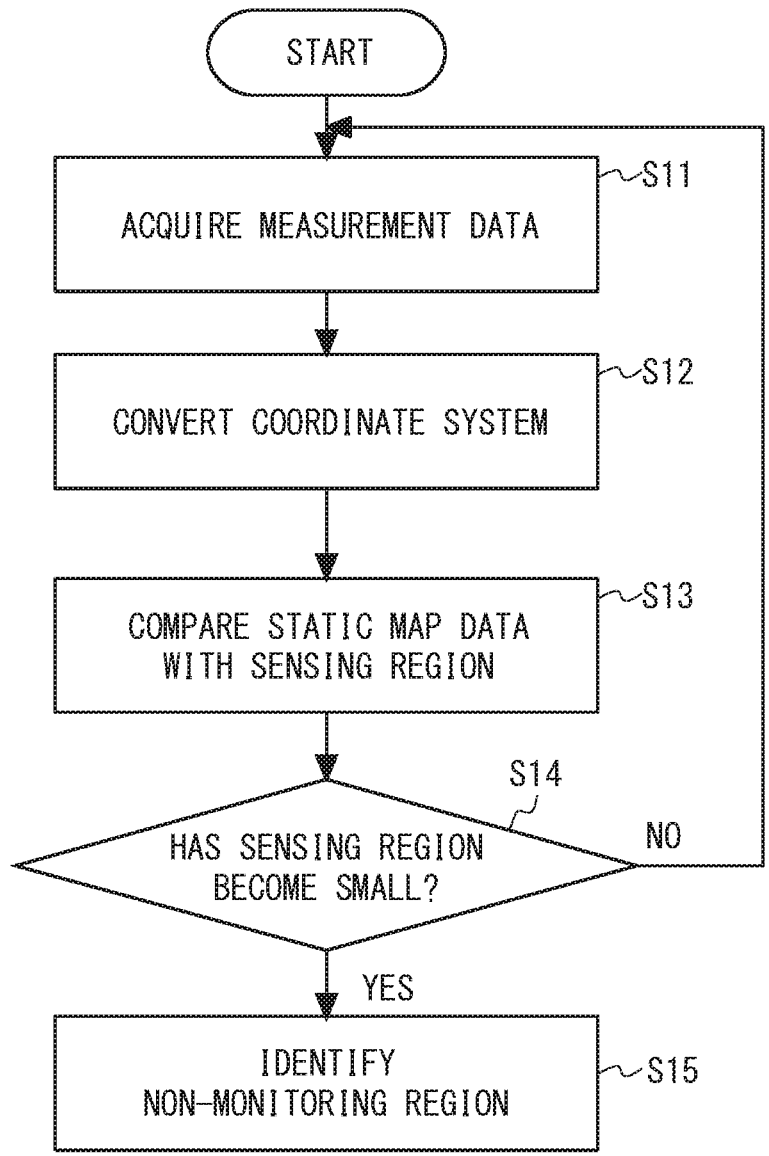
FIG. 8 is a flowchart illustrating a monitoring control method according to Example Embodiment 1.

A monitoring control method according to the present example embodiment is described by using FIG. 8. FIG. 8 is a flowchart illustrating a monitoring control method in the monitoring control device 300.

First, the measurement data acquisition unit 301 acquires measurement data (S11). In other words, the measurement data acquisition unit 301 acquires measurement data indicating a sensing region. Herein, the measurement data acquisition unit 301 acquires measurement data for each distance measurement sensor. Next, the coordinate system conversion unit 303 converts a coordinate system of the sensing region (S12). In other words, the coordinate system conversion unit 303 converts the coordinate system of the sensing region from a local coordinate system to a global coordinate system, by referring to position data of each distance measurement sensor.

The comparison unit 305 compares static map data with the sensing region (S13). In other words, the comparison unit 305 compares a sensing region in a normal state with a latest sensing region. When the sensing region has not become small (NO of S14), a return is made to S11. In other words, the above-described processing is repeated for latest measurement data.

When the sensing region has become small (YES of S14), the management unit 306 identifies a non-monitoring region in the map data. Note that, when a decrease amount of the sensing region is equal to or more than a threshold value, the comparison unit 305 may determine that the sensing region has become small. The management unit 306 may output the identified non-monitoring region by using a monitor or a speaker.

Appropriate monitoring can be implemented by the above-described monitoring control method.

Example Embodiment 2

In the present example embodiment, a sensing region of a distance measurement sensor is variable. A sensing region of a distance measurement sensor dynamically changes depending on a measurement result of the distance measurement sensor. Specifically, a distance measurement sensor narrows a sensing region, and performs a high-resolution measurement, in order to identify an intruding object or an intruder. A shape or the like of an intruding object can be identified by a measurement with a high resolution.

In a lidar, the sweeping range and the sensing density are in an inversely proportional relation. For example, the number of points N sensed by a distance measurement sensor per unit time becomes a fixed value defined by a repetition frequency of pulsed laser light. In other words, the number of points N sensed per unit time is constant. The number of points N sensed per unit time is indicated as follows when the sweeping range per unit time and sensing density are used.

$$N=(\text{sweeping range per unit time}) \times (\text{sensing density})$$

The sweeping range per unit time is defined by, for example, the sweeping speed by the direction control unit 213, i.e., a rotation speed of a rotating mirror. Sensing density is defined by, for example, the number of pulses radiated per unit angle (unit solid angle in a case of a three-dimensional sweeping). When it is assumed that the sweeping speed is constant, points of sensing are concentrated in a narrow range by narrowing the sweeping range. In other words, points of sensing can be brought closer, on a surface of an intruding object by narrowing the sweeping range.

The distance measurement sensor 201 narrows a sensing region, and thereby, performing higher-resolution sensing becomes possible. For example, when the sweeping range of 360° per second is changed to the sweeping range of 10° per second, sensing density, i.e., a resolution becomes 36 times. When pulsed laser light is radiated, with high sensing density, to a range including an intruding object, a measurement with a high resolution becomes possible, and the intruding object can be identified.

Figure 9:
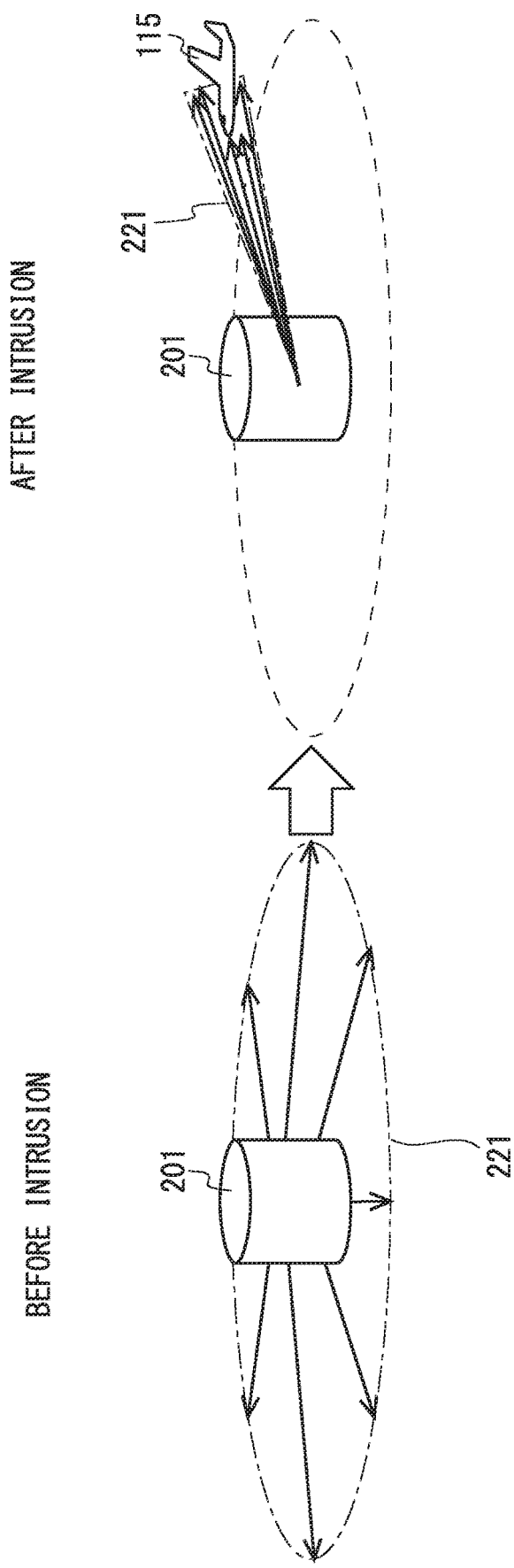
FIG. 9 is a diagram for describing a distance measurement sensor in which a sensing region is variable.

A variable sensing region is described by using FIG. 9. FIG. 9 is a diagram illustrating a change of a sensing region 221 before and after an intruding object 115 intrudes.

When the intruding object 115 intrudes into the sensing region 221, a distance measurement sensor 201 narrows the sensing region 221 toward the intruding object 115. For example, in a case of a three-dimensional sweeping, the sensing region 221 has a conical shape facing toward the intruding object 115. The distance measurement sensor 201 can perform sensing with a high resolution by heightening sensing density for the intruding object 115.

Thus, when sensing the intruding object 115, the distance measurement sensor 201 narrows a sensing region, and performs sensing in a high-resolution mode. In other words, the distance measurement sensor 201 emits an optical signal toward the intruding object 115 with high sensing density. It becomes possible to detect a shape of the intruding object 115 by performing sensing with a high resolution. It becomes possible to identify the intruding object 115 from the shape of the intruding object 115. On the other hand, when no intruding object is sensed, the distance measurement sensor 201 widens the sweeping range, and performs a measurement in a low-resolution mode.

Figure 10:
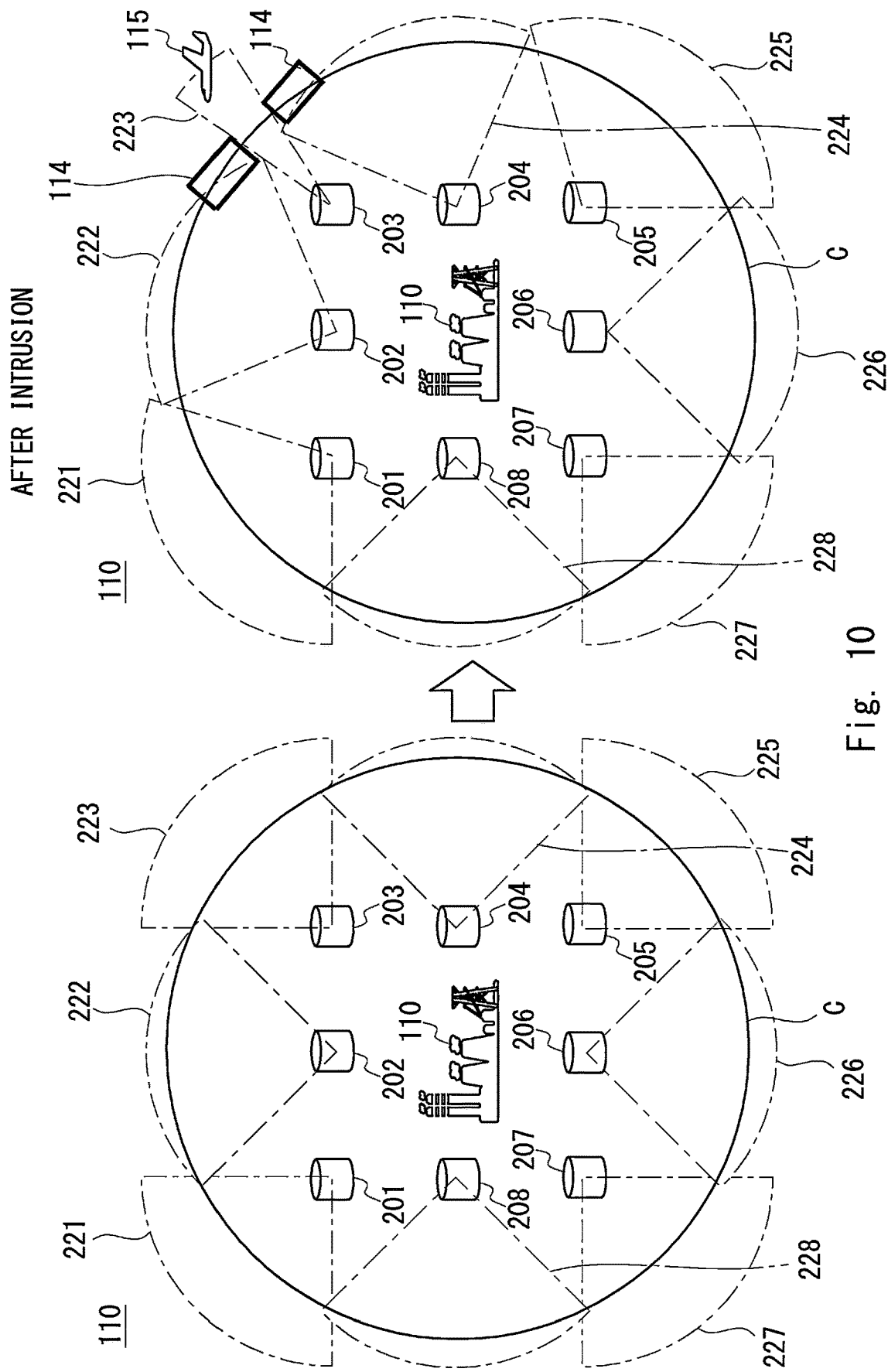
FIG. 10 is a diagram illustrating a distance measurement sensor and a sensing region placed in a target facility.

Next, a monitoring control method according to the present example embodiment is described with reference to FIG. 10. FIG. 10 is a diagram schematically illustrating a target facility 110 and a sensing region. In FIG. 10, eight distance measurement sensors 201 to 208 are arranged in the target facility 110. FIG. 10 schematically illustrates sensing regions before and after the intruding object 115 intrudes.

FIG. 10 illustrates sensing regions 221 to 228 of the distance measurement sensors 201 to 208, respectively. Herein, for simplification of description, description is given assuming that each of the distance measurement sensors 201 to 208 performs a two-dimensional sweeping. Specifically, before intrusion of the intruding object 115, each of the sensing regions 221 to 228 is in a fan shape of 90°, and faces in a different direction. Therefore, monitoring can be performed in all azimuths. In other words, it becomes possible to sense intrusion of an intruding object over a circumference of a circle C surrounding the target facility 110.

When the intruding object 115 intrudes into the sensing region 223 of the distance measurement sensor 203, the distance measurement sensor 203 narrows the sensing region 223. In other words, when sensing intrusion of the intruding object 115 from measurement data, the distance measurement sensor 203 narrows the sensing region 223, and emits an optical signal toward the intruding object 115 with high sensing density. How much the sensing region 223 is narrowed may be determined depending on a size of a sensed intruding object, or may be previously determined by a monitoring policy. Note that the monitoring policy will be described later.

The other distance measurement sensors 201, 202, 204, and 205 widen the sensing regions 221, 222, 224, and 225, respectively, in such a way as to compensate for the narrowed sensing region 223. In other words, the distance measurement sensors 201, 202, 204, and 205 change the sensing regions 221, 222, 224, and 225 in such a way as to cover a non-monitoring region 114 generated by narrowing of the sensing region 223. Thus, the non-monitoring region 114 generated due to narrowing of the sensing region by the distance measurement sensor 203 can be quickly monitored. The circumference of the circle C surrounding the target facility 110 can be always covered. Accordingly, intrusion of an intruding object can be prevented.

Note that a resolution deteriorates with regard to the distance measurement sensors 201, 202, 204, and 205 of which sensing regions are widened. In other words, since the sweeping range per unit time is widened, sensing density is low. In order to cover the non-monitoring region 114, the number of distance measurement sensors of which sensing regions are widened may be one or a plurality. Considerable deterioration of a resolution can be prevented by widening sensing regions of a plurality of distance measurement sensors and covering the non-monitoring region 114.

Figure 11:
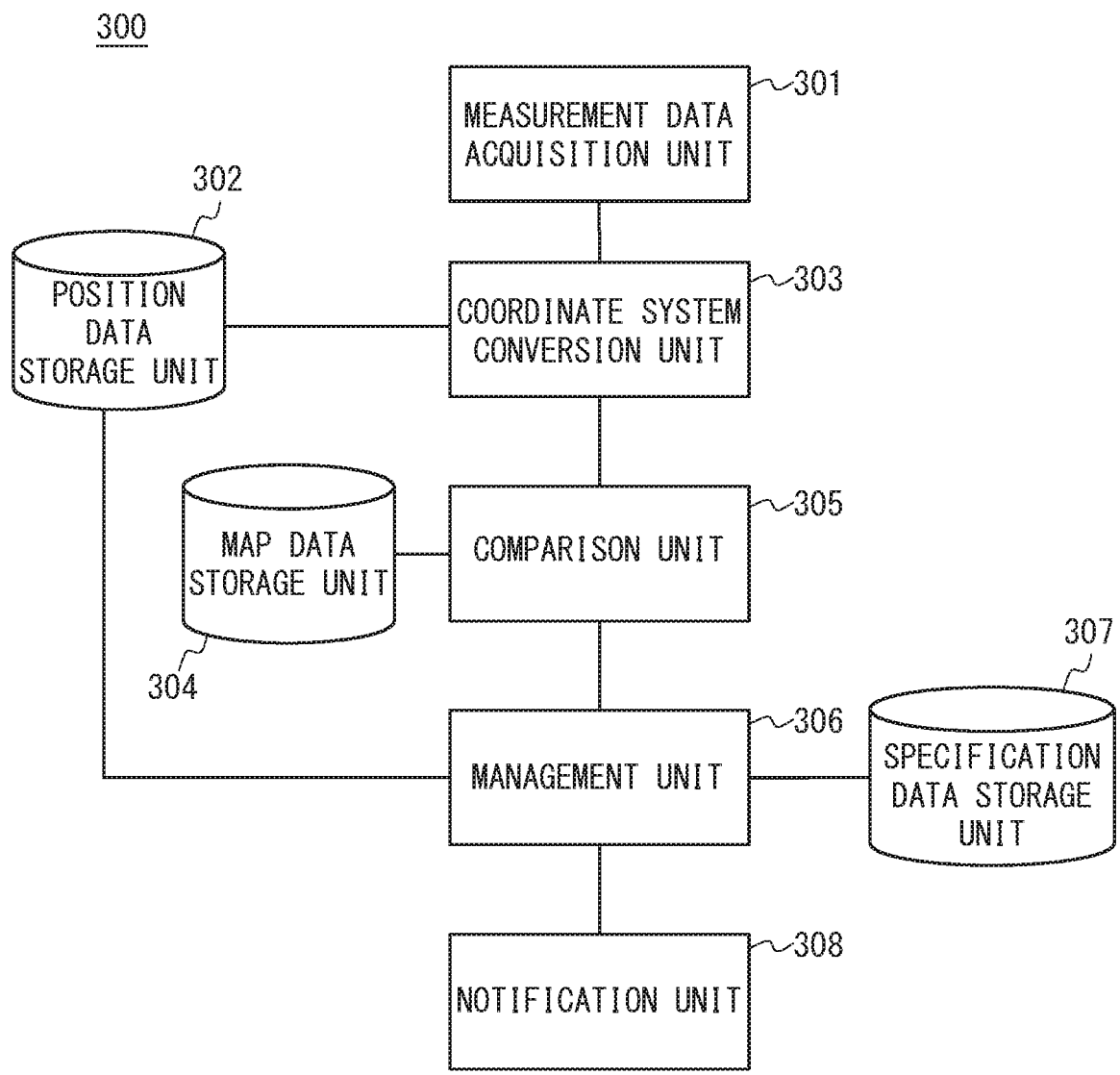
FIG. 11 is a functional block diagram illustrating a monitoring control device according to Example Embodiment 2.

A monitoring control device 300 for performing monitoring control according to the present example embodiment is described by using FIG. 11. FIG. 11 is a functional block diagram illustrating a configuration of the monitoring control device 300. In the monitoring control device 300 according to the present example embodiment, a specification data storage unit 307 and a notification unit 308 are added to the monitoring control device illustrated in Example Embodiment 1. Note that components other than the specification data storage unit 307 and the notification unit 308 are similar to those in Example Embodiment 1, and therefore, description is omitted.

The specification data storage unit 307 stores specification data of the distance measurement sensors 201 to 208. The specification data are, for example, the number of emissions of optical signals per second, i.e., a repetition frequency of pulsed laser light. When specifications of the distance measurement sensors 201 to 208 are different, the specification data storage unit 307 stores specification data for each sensor.

As in Example Embodiment 1, a comparison unit 305 compares static map data with a sensing region by measurement data, and outputs a comparison result to a management unit 306. When the sensing region has become small, the management unit 306 changes the sweeping range with reference to specification data. In other words, allocation of a sensing region is changed in such a way as to compensate for a region in which a sensing region is narrowed.

The notification unit 308 notifies the distance measurement sensors 201 to 208 of the change of the sensing region. The notification unit 308 transmits a new sweeping range. Consequently, as illustrated in FIG. 10, the sensing regions 221 to 225 of the distance measurement sensors 201 to 205 are changed. When a communication unit 218 illustrated in FIG. 4 receives the new sweeping range, the direction control unit 213 changes the sweeping range. Note that the notification unit 308 may notify only the distance measurement sensors 201 to 205 of which sensing regions need to be changed, of the change of the sensing region. When the sweeping range is changed, each of the distance measurement sensors 201 to 204 includes a communication unit (not illustrated) for receiving a change instruction of the sweeping range, and a control unit (not illustrated) that changes the sweeping range in accordance with the change instruction.

Note that a monitoring policy for determining a sensing region may be set in the management unit 306. In this case, the management unit 306 adjusts the sensing regions 221 to 228 in such a way as to satisfy the monitoring policy. Four examples below can be cited as basic monitoring policies.
(A) Monitoring interval: The entire circumference of a facility is monitored per second.
(B) Monitoring range: A circumference 360° of a facility is monitored in a range with a radius of 1 km.
(C) Minimum monitoring density: A monitoring range is monitored at intervals of at least 0.1°.
(D) Monitoring priority: Which area is desired to be fully monitored? A resolution is made higher in an area being desired to be fully monitored than in a normal area.

The management unit 306 allocates a sensing region in such a way as to satisfy the above-described monitoring policy, from placement positions of the distance measurement sensors 201 to 208 and the number of points N sensed per unit time. In this case, allocation processing by the management unit 306 mathematically arrives at an optimization problem (resource allocation problem). For example, the management unit 306 repeatedly tries a calculation for changing a sensing range, and thereby, optimum allocation can be determined.

Figure 12:
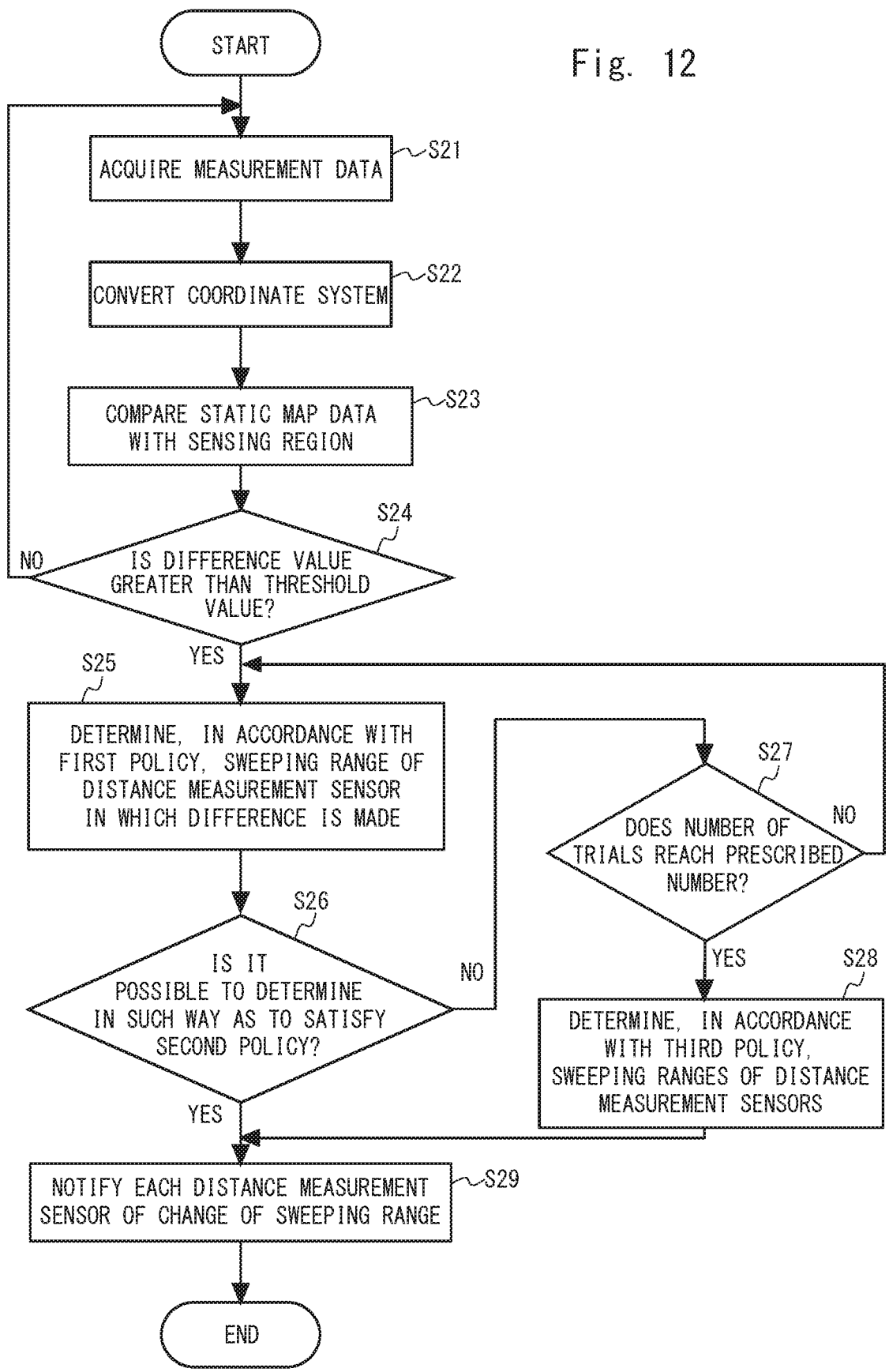
FIG. 12 is a flowchart illustrating a monitoring control method according to Example Embodiment 2.

FIG. 12 is a flowchart illustrating the monitoring control method according to Example Embodiment 2. Note that description is omitted properly for processing similar to that in Example Embodiment 1. In FIG. 12, an example in which three monitoring policies are set is illustrated.

A first policy is a policy when a difference is made, i.e., when an intruding object is sensed. Specifically, the first policy defines a resolution, the sweeping range, and the like to be satisfied by a distance measurement sensor that performs high-resolution sensing. A second policy is a policy when no difference is made, i.e., in a normal state where no intruding object is sensed. For example, the second policy is each of the above-described policies (A) to (D). A third policy is a policy indicating which of the first and second policies is a priority policy. For example, the third policy defines that a priority policy is the first policy. When the first policy and the second policy may not be satisfied simultaneously, a sensing region is allocated in such a way that the first policy is satisfied.

A measurement data acquisition unit 301 acquires measurement data (S21). Next, the coordinate system conversion unit 303 converts a coordinate system of the measurement data by referring to position data (S22). The comparison unit 305 compares static map data with a sensing region by the measurement data (S23). Note that processing similar to that in Example Embodiment 1 can be used for S21 to S23.

The comparison unit 305 determines, based on a comparison result, whether a difference value is greater than a threshold value (S24). In other words, the comparison unit 305 compares a sensing region in a normal state by the static map data with a latest sensing region by the measurement data. When a difference value between the sensing region in a normal state and the latest sensing region is equal to or more than a threshold value, the comparison unit 305 determines that the sensing region has become small. The threshold value can be defined by an area or distance of the sensing region.

The comparison unit 305 senses, by comparing the difference value with the threshold value, whether an intruding object has intruded into the sensing region. The comparison unit 305 can perform a comparison of a sensing region for each distance measurement sensor. The comparison unit 305 can identify a distance measurement sensor having a sensing region into which an intruding object has intruded.

When the difference value is not greater than the threshold value (NO of S24), the processing from S21 is repeated. In other words, since intrusion of an intruding object is not sensed, the distance measurement sensors 201 to 208 continue a measurement without changing a sensing region.

When the difference value is greater than the threshold value (YES of S24), the management unit 306 determines, in accordance with the first policy, the sweeping range of a distance measurement sensor in which a difference is made (S25). Since intrusion of an intruding object is not sensed, setting is changed in such a way as to narrow the sweeping range, in order that the distance measurement sensor 203 can sense the intruding object 115 with a high resolution.

The management unit 306 determines whether it is possible to determine the sweeping ranges of the other distance measurement sensors 201, 202, and 204 to 208 in such a way as to satisfy the second policy (S26). When it is possible to determine the sweeping ranges (YES of S26), the notification unit 308 notifies each of the distance measurement sensors 201 to 208 of the change of the sweeping range (S29).

When sweeping ranges may not be determined in such a way as to satisfy the second policy (NO of S26), the management unit 306 determines whether the number of trials of sweeping range changing calculations reaches a prescribed number (S27). When the number of trials of sweeping range changing calculations does not reach the prescribed number (NO of S27), a return is made to S25, and a sweeping range changing calculation is tried again.

When the number of sweeping range changing trials reaches the prescribed number (YES of S27), the management unit 306 determines, in accordance with the third policy, sweeping ranges of the distance measurement sensors 201 to 208 (828). In other words, when the number of trials becomes equal to or more than the prescribed number, it is difficult to satisfy the first and second policies simultaneously, and therefore, either of the policies is prioritized. For example, when the first policy is a priority policy, a change of the sweeping range of the distance measurement sensor 203 is prioritized. The notification unit 308 notifies each of the distance measurement sensors 201 to 208 of the change of the sweeping range (S29).

Thus, the monitoring control device 300 changes sweeping ranges of the distance measurement sensors 201 to 208. The monitoring control device 300 integrates the sweeping ranges of the plurality of distance measurement sensors 201 to 208, and changes allocation of the sweeping ranges. Therefore, the target facility 110 can be appropriately monitored.

An example in which a sensing region and a resolution of a distance measurement sensor are determined is described below. When primary processing (noise elimination or the like) of measurement data is performed on a distance measurement sensor side, the management unit 306 may determine a sensing region and a resolution in such a way that a data amount becomes an amount in which the primary processing can be processed without delay. For example, when a processing amount varies depending on measurement data, the management unit 306 determines a sensing region and a resolution according to the processing amount.

When measurement data are transmitted to the monitoring control device 300, the management unit 306 may determine a sensing region and a resolution according to status of a network to be used. For example, when a monitoring system 100 uses a wireless network, a communication band tends to vary. In such a case, the management unit 306 may determine a sensing region and a resolution according to network status.

The monitoring control device 300 is not limited to a physically single device, and may be achieved by a combination of a plurality of devices. For example, part or all of data may be stored in an external memory or the like. In this case, a main device reads data, and thereby, each process becomes executable. Alternatively, a sub device different from the main device may execute part of processing. Further, part of processing may be performed on a distance measurement sensor side. A communication device that performs communication with the distance measurement sensor 201 may be separately provided.

For example, a CPU executes a program stored in a ROM, and thereby, each component of the monitoring control device 300 according to each of Example Embodiments 1 and 2 is achievable. A necessary program may be recorded in any non-volatile recording medium, and installed as needed. Note that each component is not limited to being achieved by software as described above, and may be achieved by hardware such as some circuit element. One or more of the above-described components may be each achieved by physically separate hardware.

In the above-described example, a program can be stored by using various types of non-transitory computer-readable medium, and supplied to a computer. A non-transitory computer-readable medium includes various types of tangible storage media. Examples of non-transitory computer-readable media include a magnetic recording medium (e.g. a flexible disk, a magnetic tape, and a hard disk drive), a magnet-optical recording medium (e.g. a magnet-optical disk), a read only memory (CD-ROM), a CD-R, a CD-R/W, and a semiconductor memory (e.g. a mask ROM, a programmable ROM (PROM), and a erasable PROM (EPROM), a flash ROM, and a random access memory (RAM). A program may be supplied to a computer by various types of transitory computer-readable media. Examples of transitory computer-readable media include an electric signal, an optical signal, and an electromagnetic wave. A transitory computer-readable medium can supply a program to a computer via a wired communication path such as an electric wire and an optical fiber, or a wireless communication path.

While the invention of the present application has been described with reference to the example embodiments, the invention of the present application is not limited by the above description. Various changes that may be understood by a person skilled in the art can be made to a configuration and details of the invention of the present application within the scope of the invention.

Some or all of the above-described example embodiments may be also described as, but are not limited to, the following supplementary notes.

(Supplementary Note 1)

A monitoring control device including:

a measurement data acquisition unit configured to acquire measurement data indicating a sensing region of a distance measurement sensor provided in order to monitor a monitoring target facility; and a management unit configured to identify a non-monitoring region in map data indicating the monitoring target facility, based on the sensing region and position data of the distance measurement sensor.

(Supplementary Note 2)

The monitoring control device according to Supplementary note 1, wherein the measurement data acquisition unit acquires the measurement data from a plurality of the distance measurement sensors, and converts a local coordinate system of the sensing region to a global coordinate system in the map data, by referring to the position data.

(Supplementary Note 3)

The monitoring control device according to Supplementary note 2, wherein a sensing region in a normal state is associated with the map data, and the management unit identifies the non-monitoring region, based on a result of a comparison between the sensing region in the normal state and a sensing region based on the measurement data.

(Supplementary Note 4)

The monitoring control device according to any one of Supplementary notes 1 to 3, further including a notification unit configured to notify the distance measurement sensor of a change of the sensing region, wherein the measurement data acquisition unit acquires measurement data indicating a first sensing region of a first distance measurement sensor, and measurement data indicating a second sensing region of a second distance measurement sensor, and the management unit sets the second sensing region in such a way as to cover a non-monitoring region generated by narrowing of the first sensing region.

(Supplementary Note 5)

The monitoring control device according to Supplementary note 4, wherein the distance measurement sensor becomes high in resolution by narrowing the sensing region, and, when sensing intrusion of an intruding object or an intruder into the first sensing region, narrows the first sensing region in order to identify the intruding object or the intruder.

(Supplementary Note 6)

A monitoring system including:

a distance measurement sensor configured to perform sensing by sweeping an optical signal; and the monitoring control device according to any one of Supplementary notes 1 to 5.

(Supplementary Note 7)

A monitoring control method including:

a step of acquiring measurement data indicating a sensing region of a distance measurement sensor provided in order to monitor a monitoring target facility; and a step of identifying a non-monitoring region in map data indicating the monitoring target facility, based on the sensing region and position data of the distance measurement sensor.

(Supplementary Note 8)

The monitoring control method according to Supplementary note 7, further including:

acquiring the measurement data from a plurality of the distance measurement sensors, and converting a local coordinate system of the sensing region to a global coordinate system in the map data, by referring to the position data.

(Supplementary Note 9)

The monitoring control method according to Supplementary note 7 or 8, wherein a sensing region in a normal state is associated with the map data, the monitoring control method further including:

comparing the sensing region in the normal state with a sensing region based on the measurement data; and identifying the non-monitoring region, based on a comparison result.

(Supplementary Note 10)

The monitoring control method according to any one of Supplementary notes 7 to 9, further including:

acquiring measurement data indicating a first sensing region of a first distance measurement sensor, and measurement data indicating a second sensing region of a second distance measurement sensor;

setting the second sensing region in such a way as to cover a non-monitoring region generated by narrowing of the first sensing region; and notifying the first and second distance measurement sensors of a change of a sensing region.

(Supplementary Note 11)

The monitoring control method according to Supplementary note 10, wherein the distance measurement sensor becomes high in resolution by narrowing the sensing region, and, when sensing intrusion of an intruding object or an intruder into the first sensing region, narrows the first sensing region in order to identify the intruding object or the intruder.

(Supplementary Note 12)

A non-transitory computer-readable medium configured to store a program causing a computer to execute a monitoring control method, the monitoring control method including:

a step of acquiring measurement data indicating a sensing region of a distance measurement sensor provided in order to monitor a monitoring target facility; and a step of identifying a non-monitoring region in map data indicating the monitoring target facility, based on the sensing region and position data of the distance measurement sensor.

(Supplementary Note 13)

The non-transitory computer-readable medium according to Supplementary note 12, wherein the monitoring control method further includes:

acquiring the measurement data from a plurality of the distance measurement sensors, and converting a local coordinate system of the sensing region to a global coordinate system in the map data, by referring to the position data.

(Supplementary Note 14)

The non-transitory computer-readable medium according to Supplementary note 12 or 13, wherein, in the monitoring control method, a sensing region in a normal state is associated with the map data, the monitoring control method further including:

comparing the sensing region in the normal state with a sensing region based on the measurement data; and identifying the non-monitoring region, based on a comparison result.

(Supplementary Note 15)

The non-transitory computer-readable medium according to any one of Supplementary notes 12 to 14, wherein the monitoring control method further includes:

acquiring measurement data indicating a first sensing region of a first distance measurement sensor, and measurement data indicating a second sensing region of a second distance measurement sensor;

setting the second sensing region in such a way as to cover a non-monitoring region generated by narrowing of the first sensing region; and notifying the first and second distance measurement sensors of a change of a sensing region.

(Supplementary Note 16)

The non-transitory computer-readable medium according to Supplementary note 15, wherein, in the monitoring control method, the distance measurement sensor becomes high in resolution by narrowing the sensing region, and, when sensing intrusion of an intruding object or an intruder into the first sensing region, narrows the first sensing region in order to identify the intruding object or the intruder.

REFERENCE SIGNS LIST

100 MONITORING SYSTEM
110 TARGET FACILITY
111 MOVING OBJECT
112 FIXED OBJECT
113 TARGET
114 NON-MONITORING REGION
115 INTRUDING OBJECT
201 DISTANCE MEASUREMENT SENSOR
202 DISTANCE MEASUREMENT SENSOR
203 DISTANCE MEASUREMENT SENSOR
204 DISTANCE MEASUREMENT SENSOR
210 OPTICAL SIGNAL GENERATION UNIT
211 COLLIMATION UNIT
213 DIRECTION CONTROL UNIT
215 LIGHT COLLECTION UNIT
216 DETECTION UNIT
217 SIGNAL PROCESSING UNIT
218 COMMUNICATION UNIT

300 MONITORING CONTROL DEVICE
301 MEASUREMENT DATA ACQUISITION UNIT
302 POSITION DATA STORAGE UNIT
303 COORDINATE SYSTEM CONVERSION UNIT
304 MAP DATA STORAGE UNIT
305 COMPARISON UNIT
306 MANAGEMENT UNIT
307 SPECIFICATION DATA STORAGE UNIT
308 NOTIFICATION UNIT

The invention claimed is:

1. A monitoring control device comprising:
at least one memory storing instructions, and
at least one processor configured to execute the instructions to:
acquire measurement data indicating a sensing region of a plurality of distance measurement sensors provided to monitor a monitoring target facility, the plurality of distance measurement sensors perform sensing in a local coordinate system and by sweeping an optical signal;
convert the sensing region from the local coordinate system to a global coordinate system of map data indicating the monitoring target facility, by referring to position data of the plurality of distance measurement sensors;
discriminate a position that cannot be sensed and a position that can be sensed in the map data, from information relating to the plurality of distance measurement sensors and information relating to a fixed object placed in the monitoring target facility; and
identify a non-monitoring region in the map data, based on the sensing region and position data of the plurality of distance measurement sensors, when the sensing region indicated by the measurement data is smaller than the sensing region in a normal state associated with the map data.

2. The monitoring control device according to claim 1, wherein
the at least one processor configured to execute the instructions to notify the plurality of distance measurement sensors of a change of the sensing region,
the measurement data indicates a first sensing region of a first distance measurement sensor and a second sensing region of a second distance measurement sensor, and
the second sensing region is set so as to cover the non-monitoring region generated by narrowing of the first sensing region.

3. The monitoring control device according to claim 2, wherein
a resolution of the first distance measurement sensor increases by narrowing of the first sensing region, and
when intrusion of an intruding object or an intruder into the first sensing region is sensed, the first sensing region is narrowed to identify the intruding object or the intruder.

4. The monitoring control device according to claim 2, wherein the at least one processor is configured to execute the instructions to further:
move the second distance measurement sensor in order to cover the non-monitoring region generated by narrowing of the first sensing region.

5. A monitoring system comprising:
the plurality of distance measurement sensors; and
the monitoring control device according to claim 1.

6. A monitoring control method performed by a monitoring control device and comprising:
acquiring measurement data indicating a sensing region of a plurality of distance measurement sensors provided to monitor a monitoring target facility, the plurality of distance measurement sensors perform sensing in a local coordinate system and by sweeping an optical signal;
converting the sensing region from the local coordinate system to a global coordinate system of map data indicating the monitoring target facility, by referring to position data of the plurality of distance measurement sensors;
discriminating a position that cannot be sensed and a position that can be sensed in the map data, from information relating to the plurality of distance measurement sensors and information relating to a fixed object placed in the monitoring target facility; and
identifying a non-monitoring region in the map data, based on the sensing region and position data of the plurality of distance measurement sensors, when the sensing region indicated by the measurement data is smaller than the sensing region in a normal state associated with the map data.

7. The monitoring control method according to claim 6, further comprising:
notifying the plurality of distance measurement sensors of a change of the sensing region, wherein
the measurement data indicates a first sensing region of a first distance measurement sensor and a second sensing region of a second distance measurement sensor, and
the second sensing region is set so as to cover the non-monitoring region generated by narrowing of the first sensing region.

8. The monitoring control method according to claim 7, wherein
a resolution of the first distance measurement sensor increases by narrowing of the first sensing region, and
when intrusion of an intruding object or an intruder into the first sensing region is sensed, the first sensing region is narrowed to identify the intruding object or the intruder.

9. The monitoring method according to claim 7, further comprising:
moving the second distance measurement sensor in order to cover the non-monitoring region generated by narrowing of the first sensing region.

10. A non-transitory computer-readable medium storing a program causing a computer to execute a monitoring control method comprising:
acquiring measurement data indicating a sensing region of a plurality of distance measurement sensors provided to monitor a monitoring target facility, the plurality of distance measurement sensors perform sensing in a local coordinate system and by sweeping an optical signal;
converting the sensing region from the local coordinate system to a global coordinate system of map data indicating the monitoring target facility, by referring to position data of the plurality of distance measurement sensors;
discriminating a position that cannot be sensed and a position that can be sensed in the map data, from information relating to the plurality of distance measurement sensors and information relating to a fixed object placed in the monitoring target facility; and
identifying a non-monitoring region in the map data, based on the sensing region and position data of the plurality of distance measurement sensors, when the sensing region indicated by the measurement data is smaller than the sensing region in a normal state associated with the map data.

11. The non-transitory computer-readable medium according to claim 10, wherein the monitoring control method further includes:
notifying the plurality of distance measurement sensors of a change of the sensing region, wherein
the measurement data indicates a first sensing region of a first distance measurement sensor and a second sensing region of a second distance measurement sensor, and
the second sensing region is set so as to cover the non-monitoring region generated by narrowing of the first sensing region.

12. The non-transitory computer-readable medium according to claim 11, wherein
a resolution of the first distance measurement sensor increases by narrowing of the first sensing region, and
when intrusion of an intruding object or an intruder into the first sensing region is sensed, the first sensing region is narrowed to identify the intruding object or the intruder.

13. The non-transitory computer-readable medium according to claim 11, wherein the monitoring control method further comprises:
moving the second distance measurement sensor in order to cover the non-monitoring region generated by narrowing the first sensing region.

* * * * *